June 19, 1928.

F. L. COSTENBADER 1,673,865

AUTOMOBILE SIGNAL

Filed Feb. 24, 1928

Inventor

F. L. Costenbader

By Clarence A. O'Brien

Attorney

Patented June 19, 1928.

1,673,865

UNITED STATES PATENT OFFICE.

FRANK L. COSTENBADER, OF RICHMOND, VIRGINIA.

AUTOMOBILE SIGNAL.

Application filed February 24, 1928. Serial No. 256,653.

The object of my said invention is the provision of a signal, of simple and inexpensive construction, designed to be applied to an automobile, and to be operated by a driver or other person within the automobile, to communicate to other drivers the intentions of the automobile operator with respect to slowing up, making a left hand turn, and making a right hand turn.

To the attainment of the foregoing, the invention consists in the improvement as hereinafter described and definitely claimed.

In the accompanying drawings, forming a part of this specification:

Figures 1, 2:
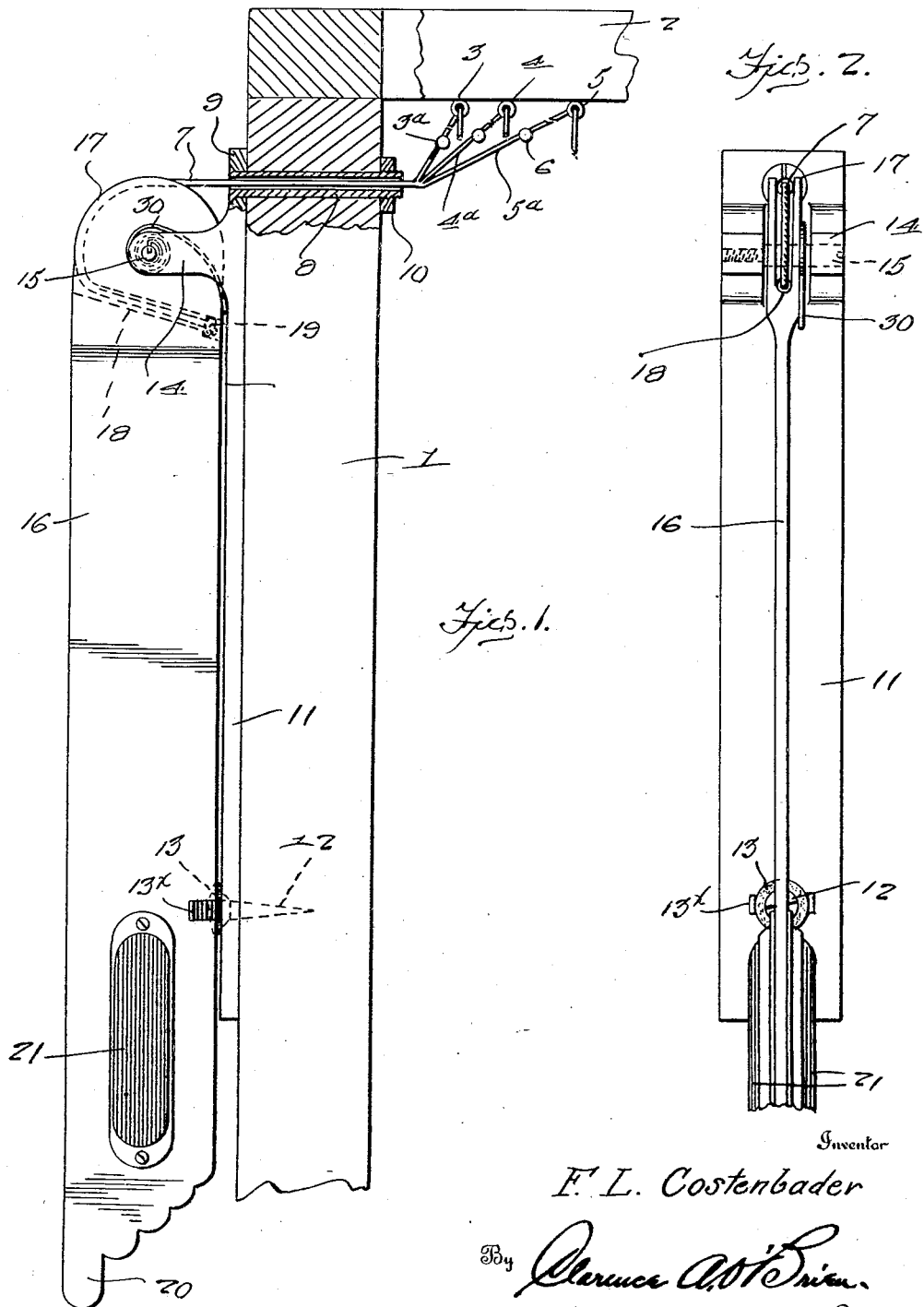
Figure 1 is a view, partly in elevation and partly in section, illustrating a portion of an automobile and the preferred arrangement of my novel signal thereon.
Figure 2 is an exterior view showing the signal per se.

Similar numerals designate corresponding parts in both views of the drawings. I show, in Figure 1, an upright wall 1 and the top 2 of an automobile body, the top 2 being equipped with a plurality of guides 3, 4 and 5, connected thereto, and adapted to receive cables $3^a$, $4^a$, and $5^a$, respectively. The illustrated pendent portions of the said cables may be provided with rings, knobs, or the like, although I have not deemed it necessary to illustrate such rings, knobs or other devices. It will also be observed that each of the cables is provided at the left of the guide or eye, complementary to the cable, with a button or enlargement 6 designed to bring up against the guide complementary to the cable. The several cables $3^a$, $4^a$, and $5^a$ are merged into a common cable 7 and the said common cable 7 is carried transversely through the upright wall 1 of the automobile body to a position at the outer side of said wall. In the preferred embodiment of my invention, the cable 7 is guided in a tubular bolt 8, headed at 9 and equipped with a nut 10.

In Figures 1 and 2, I show the bracket plate 11 of my improvement, the lower portion of said bracket plate 11 being connected to the upright wall 1 of the automobile body, through the medium of a screw 12. In the upper portion of the plate 11 is an aperture and a counter sink as clearly brought out in Figure 1, the aperture being for the passage of the bolt, and the counter-sink to receive the head 9 of said bolt 8, so that said head 9 will rest flush with the outer side of the plate 11 and in that way contribute to the finished appearance of the signal.

The bracket plate 11 is provided at 13, with a pad or cushion, and near its upper end, said bracket plate 11 is provided with two outwardly reaching arms 14, in which is journaled a shaft 15, fixed to the swingable arm 16, which constitutes an important feature of my invention. The outer portion of the cable 7 is carried in a grooved end portion 17 of the arm 16, and is passed through an aperture 18 in the arm 16, and is anchored at 19, to the arm in a recess formed in the inner edge of the arm, as appears at the left of Figure 1. The end portions of the arm 16 remote from the end 17 is preferably, though not necessarily, made in simulation of a hand, as designated by 20, and adjacent to the said end 20, the arm 16 is equipped at both sides with reflecting devices 21, of oblong or elongated form, as illustrated in Figure 1 and disposed longitudinally of the arm 16. While I prefer to employ two reflectors 21, one at each side of the arm 16, I do not desire to be understood as limiting myself to such provisions, as within the purview of my invention only one reflector need be employed, or any other means may be employed in lieu of a reflector or reflectors for rendering the arm 16 readily discernible in the night time. The elongated form and the arrangement shown and described of the reflector 21 is advantageous because the position of the reflector which will ordinarily be illuminated by an automobile in the rear, will enable the driver of the latter automobile to discern the position of the arm 16 relative to the automobile body.

In the practical embodiment of my invention, the parts are so arranged that when the pendent portion of the cable $3^a$ is pulled upon, until the stop or button 6 on said cable springs up against the guide 3, the arm 16 will be swung upwardly and into a position at right angles or substantial right angles to the body 1, thereby indicating that the driver of the automobile contemplates the making of a left hand turn. When the driver of the automobile pulls upon the pendent portion of the cable $4^a$ until the button or stop on said cable $4^a$ brings up against the guide 4, the arm 16 will be moved into a downwardly and outwardly inclined position, indicating caution or that it is the purpose of the driver of the automobile to slow up. When the driver of the automobile pulls upon the pendent portion of the cable 5ª until the stop 6 on said cable brings up against the guide 5, the arm 16 will be swung into an upwardly and outwardly inclined position and thereby indicating that it is the purpose of the automobile driver to make a right hand turn. In this connection, it will be understood that the arm 16 in each case is stopped when one of the stops or buttons 6 brings up against its respective guide, and consequently it is necessary for the automobile driver to observe the arm 16. It is only necessary for him to know the particular cable which he is actuating, in order to be sure that the arm 16 has been positioned as desired.

It will be readily understood that when any one of the cables is released, subsequent to the raising of the arm 16, the arm 16 will gravitate to the normal position shown in Figures 1 and 2, the part 13 serving to absorb any shock incident to the gravitation of the arm 16. I would also have it understood that when deemed expedient, a spring 30 may be employed for assisting the return of the arm 16 to its normal position. Within the purview of my invention, said spring may be of any construction and may be arranged in any approved manner, but the preferred spring illustrated is connected to and wound about the shaft 15 and has one of its ends connected to the bracket plate 11. From this it follows that when the arm 16 is swung outwardly, the spring 30 will be tensioned, so that when the arm 16 is released, the spring will promptly return the arm to the normal position illustrated.

The arm 16 of my improvement may be formed of aluminum or of any other material, and it will be noted that when the said arm and the other parts of my improvement are properly embellished, they will enhance, rather than detract from the finished appearance of an automobile.

It will also be appreciated that my novel signal is simple and inexpensive in construction, and that it is readily applicable to automobiles, such as at present in use.

I have entered into a detailed description of the preferred embodiment of my invention, in order to impart a full, clear and exact understanding of the said embodiment. I do not desire, however, to be understood, as limiting myself to the specific construction and relative arrangement of parts as described, my invention being defined by my appended claims, within the scope of which modifications may be made, without departing from my invention. The screw that holds the pad 13 is also preferably utilized to hold a guide 13ˣ the purpose of which is to assure the arm 16 properly striking the pad.

I claim:

1. A signal comprising a single movable signal device on an automobile body, a plurality of cables connected in common with said device and disposed within said body, guides for said cables, and stops on the cables and adapted to bring up against the guides; said stops being relatively arranged to limit the movement of said single signal device, to different positions relative to the body.

2. An automobile signal comprising a single movable signal device of swingable type on an automobile body, a plurality of cables disposed within the body, a plurality of guides in the body for said cables, stops on the cables and adapted to bring up against the guides, and a cable connected with all of the first named cables and extending from a point within the body to a point exterior thereof and connected to the single swingable signal device.

3. In combination, an automobile body having an upright wall, and a top, a bracket plate opposed to the outer side of the upright wall and connected adjacent to its lower end to said wall, said bracket plate having outwardly extending arms, and also having an aperture and a countersink in its upper portion, a threaded and headed tubular bolt extending through the upper portion of the plate and the upright wall of the body and arranged with its head in said countersink and its inner end extending inwardly beyond said body wall, a nut on the inner portion of said bolt, guides carried by the top of the body, a swingable arm having a shaft journaled in the arms on the bracket plate, a cable connected to the upper portion of said arm, and extending through said tubular bolt, and a plurality of cables connected to the first named cable within the body and extending through the said guides on the body top and having pendent portions and also having stops, said stops being arranged between the first named cable and the guides and being adapted to bring up against said guides.

In testimony whereof I affix my signature.

FRANK L. COSTENBADER.